United States Patent
Beal et al.

(10) Patent No.: US 9,207,339 B2
(45) Date of Patent: Dec. 8, 2015

(54) OPTICAL SEISMIC SENSOR SYSTEMS AND METHODS

(71) Applicants: A Craig Beal, Stoneham, MA (US); Malcolm E Cummings, Somerville, MA (US); Anton Zavriyev, Swampscott, MA (US); Caleb A Christensen, Somerville, MA (US); Keun Lee, Newburyport, MA (US)

(72) Inventors: A Craig Beal, Stoneham, MA (US); Malcolm E Cummings, Somerville, MA (US); Anton Zavriyev, Swampscott, MA (US); Caleb A Christensen, Somerville, MA (US); Keun Lee, Newburyport, MA (US)

(73) Assignee: Magi-Q Technologies, Inc., Somerville, MA (US)

( * ) Notice: Subject to any disclaimer, the term of this patent is extended or adjusted under 35 U.S.C. 154(b) by 315 days.

(21) Appl. No.: 13/748,289

(22) Filed: Jan. 23, 2013

(65) Prior Publication Data

US 2014/0202786 A1 Jul. 24, 2014

(51) Int. Cl.
| | |
|---|---|
| *G01V 1/06* | (2006.01) |
| *G01V 1/18* | (2006.01) |
| *G01B 9/02* | (2006.01) |
| *G01H 9/00* | (2006.01) |

(52) U.S. Cl.
CPC .............. *G01V 1/18* (2013.01); *G01B 9/02014* (2013.01); *G01B 9/02025* (2013.01); *G01B 9/02027* (2013.01); *G01H 9/004* (2013.01)

(58) Field of Classification Search
USPC ......................................................... 367/178
See application file for complete search history.

(56) References Cited

U.S. PATENT DOCUMENTS

| | | | | |
|---|---|---|---|---|
| 5,351,122 | A * | 9/1994 | Niebauer et al. ............... | 356/496 |
| 5,892,151 | A * | 4/1999 | Niebauer et al. ............ | 73/382 R |
| 5,903,349 | A * | 5/1999 | Vohra et al. ................... | 356/477 |
| 6,384,919 | B1 * | 5/2002 | Fersht et al. .................. | 356/477 |
| 6,671,057 | B2 * | 12/2003 | Orban ........................... | 356/496 |
| 7,021,146 | B2 * | 4/2006 | Nash et al. ...................... | 73/653 |
| 7,684,051 | B2 * | 3/2010 | Berthold et al. .............. | 356/519 |
| 7,894,297 | B2 * | 2/2011 | Nutt et al. ........................ | 367/25 |
| 2003/0081218 | A1 * | 5/2003 | Orban ........................... | 356/450 |
| 2005/0120796 | A1 * | 6/2005 | Nash et al. ...................... | 73/653 |
| 2006/0131015 | A1 * | 6/2006 | Kanayama et al. ......... | 166/254.2 |
| 2006/0219009 | A1 * | 10/2006 | Maas et al. .................. | 73/514.26 |
| 2007/0165487 | A1 * | 7/2007 | Nutt et al. ........................ | 367/25 |
| 2007/0189658 | A1 * | 8/2007 | Maas .............................. | 385/12 |
| 2008/0174781 | A1 * | 7/2008 | Berthold et al. .............. | 356/477 |
| 2009/0223291 | A1 * | 9/2009 | Donadille et al. ............. | 73/32 R |
| 2010/0182872 | A1 * | 7/2010 | Nash et al. ...................... | 367/20 |
| 2011/0303005 | A1 * | 12/2011 | Donadille et al. .......... | 73/382 R |
| 2011/0320147 | A1 * | 12/2011 | Brady et al. .................... | 702/66 |

* cited by examiner

*Primary Examiner* — James Hulka

(57) ABSTRACT

Disclosed is an optical seismic sensor system for measuring seismic events in a geological formation, including a surface unit for generating and processing an optical signal, and a sensor device optically connected to the surface unit for receiving the optical signal over an optical conduit. The sensor device includes at least one sensor head for sensing a seismic disturbance from at least one direction during a deployment of the sensor device within a borehole of the geological formation. The sensor head includes a frame and a reference mass attached to the frame via at least one flexure, such that movement of the reference mass relative to the frame is constrained to a single predetermined path.

29 Claims, 14 Drawing Sheets

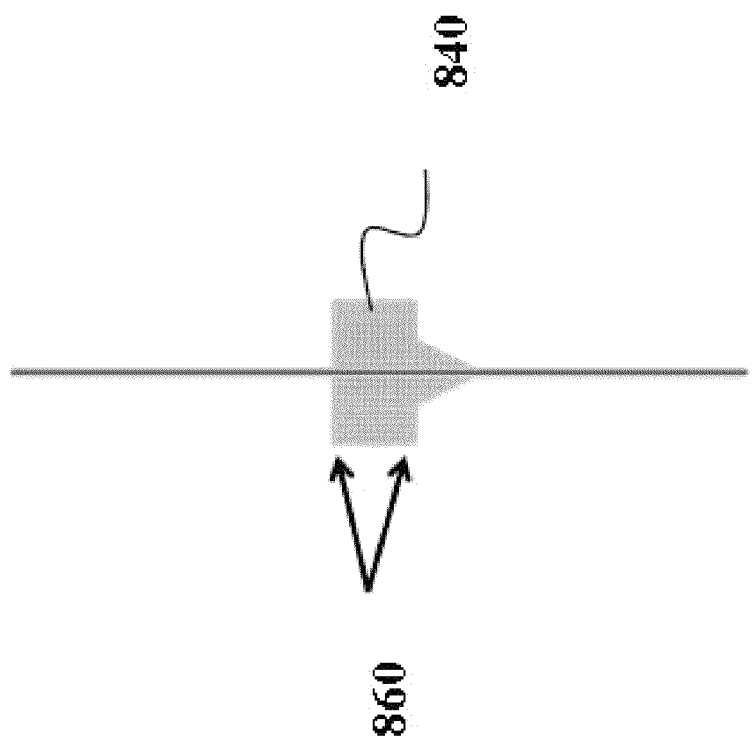

900

1000

1100

1200

OPTICAL SEISMIC SENSOR SYSTEMS AND METHODS

STATEMENT REGARDING FEDERALLY SPONSORED RESEARCH OR DEVELOPMENT

This invention was made with government support under SBIR Grant No. DE-SC0002490 awarded by the Department of Energy. The government therefore has certain rights in the invention.

CROSS-REFERENCE TO RELATED APPLICATIONS

This application claims the priority under 35 U.S.C. §119 (e) from U.S. provisional application Ser. No. 61/589,460 and Ser. No. 61/662,108, both filed on Jan. 23, 2012, the disclosure of which being incorporated herein by reference.

FIELD OF THE INVENTION

This invention relates to optical sensor systems for measuring seismic events in geological formations, and, in particular, to seismic sensor systems and methods employing optical interferometers.

BACKGROUND OF THE INVENTION

Seismic events are common place occurrences in most parts of the world and happen on a wide range of scales from the smallest vibrations to the largest earthquakes. While measuring large seismic events is a fairly straightforward exercise, accurately measuring smaller seismic events is more challenging.

Oil-field drilling, stimulation, and production activities often cause microearthquakes (microseismic events), either by compacting rock, propagating fractures, or relieving shear stress. Thus, induced seismicity monitoring is one of the primary methods that field operators use to visualize reservoir conditions during enhanced recovery operations. For example, frequency, intensity, and spatial distribution of microseismic events may reveal valuable information about the chemical, hydraulic, and/or mechanical processes occurring in the volume around boreholes in the earth. Because high acoustic frequencies attenuate as they propagate through the rock, only borehole-placed sensors can provide necessary spatial resolution. However, many of the fields that are candidates for enhanced recovery operations also exhibit harsh environmental conditions in which existing seismic sensors are known to fail. Temperatures can be well outside the engineering specifications of traditional sensors, which rely on electronics to detect and communicate earth motion. Corrosive fluids generated by enhanced recovery methods further threaten sensors, especially at high temperatures where connectors and seals are less reliable.

Optical interferometry is a common technique used to measure small displacements of an object relative to a reference and are used in a wide variety of instruments, including gyroscopes, accelerometers and quantum cryptography systems to name a few. Optical interferometers based on optical fibers in particular have proven useful in many systems and instruments because the optical fibers can be easily manipulated and controlled.

Optical fiber technologies have recently become available for use in conventional oil and gas research, where they have shown great reliability in distributed temperature sensing and long range signal transmission. However, conventional optical seismic sensors are suitable for lower temperature environments such as towed arrays of hydrophones, ocean bottom arrays, or moderate temperature boreholes.

Thus, while optical interferometry has been shown promise for detecting seismic events, conventional approaches still present a number of challenges. For example, the temperature in a deep borehole formed the earth can be 300° C. or greater, far exceeding temperature ranges for reliable operation of electronic equipment. In addition, there is a need for sensor minimizing crosstalk between various directions of seismic disturbance to achieve acceptable levels of accuracy of measuring seismic data.

SUMMARY OF THE INVENTION

Applicants have recognized and appreciated that achieving relative unidirectional movement of a reference mass within an optical sensor device may enable reliable and cost-effective seismicity monitoring via optical interferometry, while addressing a number of disadvantages of conventional solutions.

Generally, in one aspect, the invention relates to an optical seismic sensor system for measuring seismic events in a geological formation, which includes a surface unit for generating and processing an optical signal; and a sensor device optically connected to the surface unit and configured for receiving the optical signal over an optical conduit. The sensor device includes at least one sensor head for sensing a seismic disturbance from at least one direction during a deployment of the sensor device within a borehole of the geological formation. The sensor head includes a frame affixed within the sensor device, a reference mass attached to the frame via at least one flexure, such that movement of the reference mass relative to the frame is constrained to a single predetermined path; and an optical module forming at least part of the optical conduit connecting the frame, the reference mass and the surface unit, such that the movement of the reference mass relative to the frame changes a length of the optical conduit.

Various embodiments of the invention include one or more of the following features. The sensor device may include a plurality of sensor heads for sensing seismic disturbances from a plurality of directions. For example, the plurality of sensor heads may be arranged within the sensor device to sense the seismic disturbances from orthogonal directions. In some embodiments, the sensor device is optically connected to the surface unit via an optical fiber section, the optical module of the sensor including a mirror aligned to reflect the optical signal, such that the mirror and the optical fiber section are in optical communication over a free space forming a part of the optical conduit. Alternatively, in various embodiments, the optical module includes an optical fiber attached to the frame and to the reference mass, such that the relative movement of the reference mass changes a length of the optical fiber. The optical fiber may form at least one loop around at least a portion of the frame and at least a portion of the reference mass. For example, in one embodiment, the optical fiber is arranged around the frame and the reference mass forming a plurality of loops such that the relative movement of the mass equally changes a length of each loop. The frame and the reference mass may form a sensor body having a cross-section substantially formed by two semicircular sections connected by two straight sections, such that the optical module includes a fiber coil encircling the sensor body multiple times over the semicircular and straight sections.

In some embodiments of the invention, the flexure includes a first flexure member and a second flexure member that each includes first and second symmetrical flexure linkages respectively defined by at least three circular notch hinges.

In other embodiments of the invention, the flexure includes a first flexure linkage and a second flexure linkage, each flexure linkage including at least three notch hinges, wherein the second flexure linkage is arranged as a symmetrical reflection of the first linkage over a first plane of the path of movement of the reference mass. Also, the flexure may include a third flexure linkage and a fourth flexure linkage arranged as a symmetrical reflection of the third linkage over a second plane of the path of movement of the reference mass and perpendicular to the first plane.

In various embodiments of the invention, the sensor device includes a casing that includes a deployable latching arm for fixing the sensor device within the borehole. The casing may include a timing mechanism configured to deploy the latching arm to an open position, the timing mechanism includes a winding pin for selecting a time of deployment, the casing further includes a shear pin operably disposed with the latching arm so that a sufficient upward force on the sensor device breaks the shear pin and releases the latching arm.

Also, in one embodiment, the surface unit includes an unbalanced Mach-Zehnder interferometer having first and second arms with at least one of the arms having an adjustable optical conduit, the interferometer configured to interfere and process the optical signal.

Generally, in another aspect, the invention focuses on an optical sensor device for measuring seismic events in a geological formation. Under this aspect of the invention, the sensor includes a casing having a deployable latching arm for fixing the sensor within a borehole of the geological formation, a frame affixed to the casing, a reference mass attached to the frame via at least one flexure, such that movement of the reference mass relative to the frame is constrained to a single predetermined path; and a waveguide connected to the frame and the reference mass such that the relative motion of the mass changes a length of the waveguide. The frame and the reference mass may form a sensor body having a cross-section substantially formed by two semicircular sections connected by two straight sections, wherein the waveguide includes a fiber coil looping the sensor body multiple times over the semicircular and straight sections, such that the relative motion of the mass equally changes a length of each loop. Also, the flexure may include a first flexure linkage and a second flexure linkage, each flexure linkage includes three notch hinges, wherein the second flexure linkage is arranged as a symmetrical reflection of the first linkage over a first plane of the path of movement of the reference mass.

Generally, in yet another aspect, the invention focuses on an optical sensor device for measuring seismic events in a geological formation. Under this aspect of the invention, the sensor includes a frame; and a reference mass attached to the frame via at least one flexure, such that movement of the reference mass relative to the frame is constrained to a single predetermined path; wherein the frame and the reference mass form a sensor body having a cross-section substantially formed by two semicircular sections connected by two straight sections, wherein the flexure includes a first flexure linkage and a second flexure linkage arranged as a symmetrical reflection of the first linkage over a first plane of the path of the movement of the reference mass, and a third flexure linkage and a fourth flexure linkage arranged as a symmetrical reflection of the third linkage over a second plane of the path of the movement of the reference mass and perpendicular to the first plane, wherein each flexure linkage includes three notch hinges; and a fiber coil looping the sensor body multiple times, such that the relative motion of the mass equally changes a length of each loop.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 8A-8C illustrates an example embodiment of a ferrule assembly used for securing the optical fiber to the fiber-based sensor device.

DETAILED DESCRIPTION

Various implementations of the present invention and related inventive concepts are described below. It should be appreciated, however, that the present invention is not limited to any particular manner of implementation, and that the various embodiments discussed explicitly herein are primarily for purposes of illustration.

Figure 1:
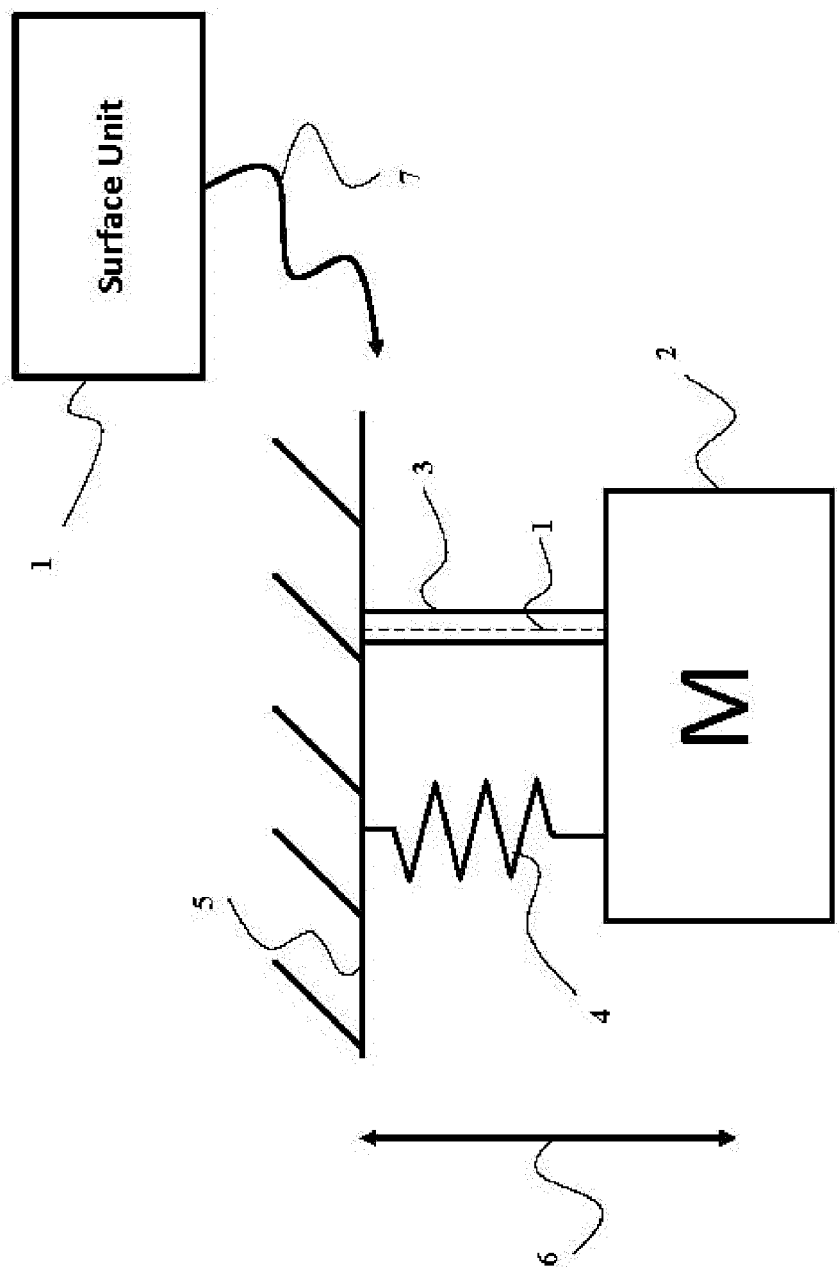
FIG. 1 is a schematic diagram of an example optical seismic sensor system according to various embodiments of the invention.

FIG. 1 schematically illustrate a general system architecture of the optical sensor system implemented in various embodiments of an invention and described in detail below. Referring to FIG. 1, a reference mass 2 is connected to a frame 5 via a flexure 4 constraining a movement of the mass 2 relative to the frame to a single predetermined direction or path 6. An optical module 3 forms an optical conduit 1 connecting the frame and the reference mass, such that the movement of the reference mass relative to the frame changes a length of the optical conduit. For example, in one embodiment, the optical module includes an optical fiber coil fixed to both the reference mass and the frame. Relative motion between the reference mass and the frame stretches the fiber coil, producing a detectable change in the length of the path of light travelling through the fiber.

The sensor concept shown in FIG. 1 is configured as a mass-spring system that deforms a waveguide, such as fiber, in response to the disturbance. If the frame is affixed to the geological formation, the motion of the geological formation disturbs both the frame and the reference mass. In all but one direction, the mass and the frame are similarly disturbed causing no relative motion. However, due to the constraints impose by the flexure 4, along a single predetermined path 6, the mass and the frame are disturbed differently causing the relative motion measurable by a change of the length of the optical conduit.

This realization can be used to integrate a plurality of sensors into a single sensor device, each sensor sensitive to seismic stimulation along a different axis. Seismic data from each sensor can then be used to determine the magnitude of the seismic wave received at the sensor device and the direction from which it arrived. For example, a three-component (3C) sensor can form a sensor device configured to deploy into a deep borehole, where the sensor device can be rigidly attached to a geological formation and used to monitor seismic waves travelling through the formation.

Advantageously, this realization allows decoupling measurements of the seismic disturbance from different direction using just mechanical components suitable to be deployed underground. The sensors according to some embodiments do not have electronic components shown to be unreliable in the harsh environment of a deep borehole.

In some embodiments, the sensors are optically connected to a surface unit 1 located above the surface for generating and processing an optical signal 7. The surface unit includes all electronic components necessary for optical measurements. The surface unit can include various components for modulating the optical phase or frequency of the generated optical signal 7 and demodulating the optical signal modified by the sensor device. For example, in one embodiment, the surface unit includes an interferometer, e.g., one or more unbalanced interferometers. A sensor device and/or the sensor can be optically connected to the surface unit for receiving the optical signal over an optical conduit, such that that the relative motion of the mass changes a length of the optical conduit.

Figure 2:
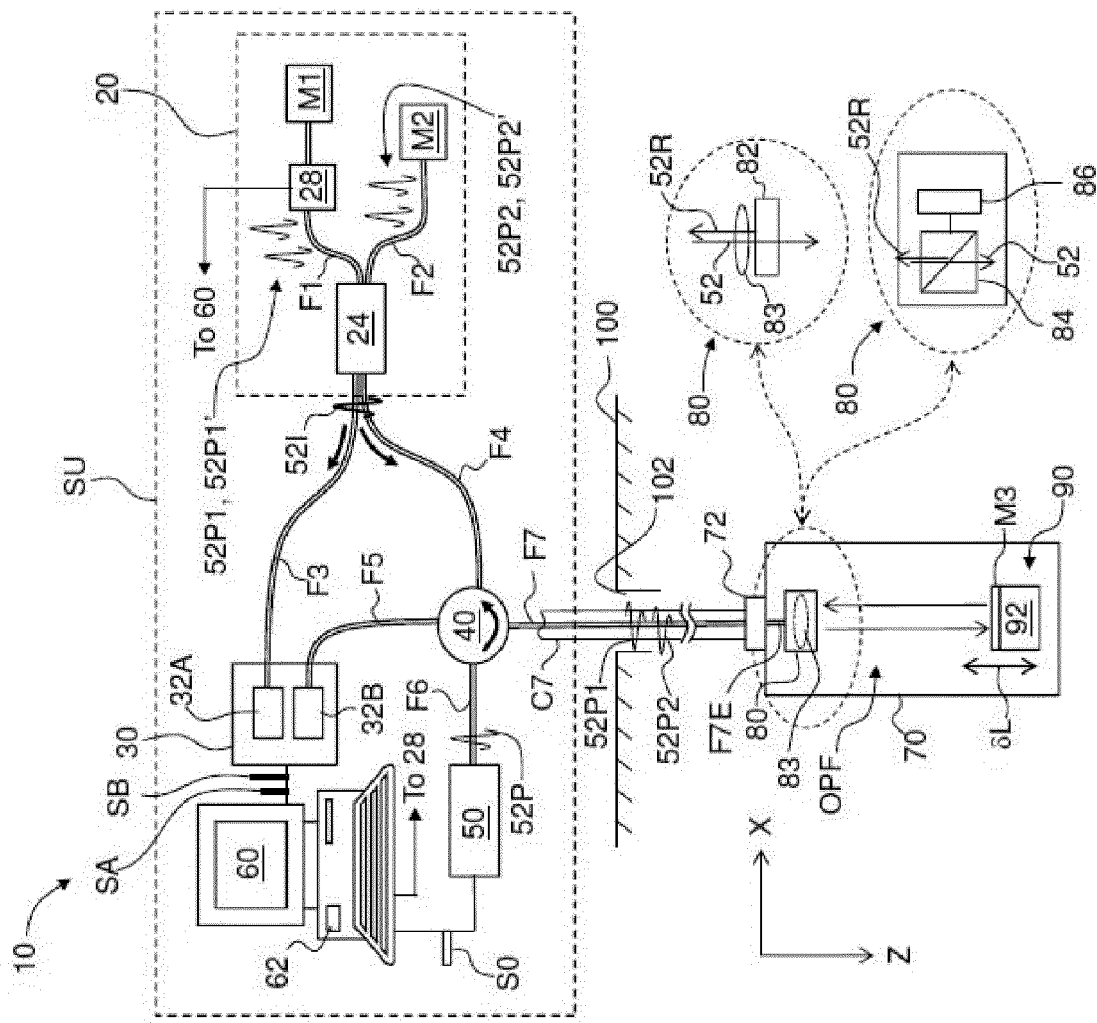
FIG. 2 is a schematic diagram of the interferometric optical seismic sensor system according to some embodiments of the invention employing some principles illustrated in connection with FIG. 1.

FIG. 2 is a schematic diagram of the optical seismic sensor system 10 according to one embodiment employing some principles described above in connection with FIG. 1. Cartesian coordinates are provided in FIG. 2 for reference and are not intended to be limiting as to direction or orientation.

The system 10 includes a fiber optic compensating interferometer ("interferometer") 20 that includes two optical fiber sections F1 and F2 each connected at their first ends to a fiber beam splitter 24 and at their second ends to respective mirrors M1 and M2. Fiber sections F1 and F2 have different lengths and define respective arms of the interferometer that are said to be "unbalanced." Fiber section F1 includes a modulator 28 configured to alter the length of the optical conduit associated with fiber section F1 and mirror M1. In the example shown, fiber section F1 is longer than fiber section F2. In an example, interferometer 20 comprises an unbalanced Mach-Zehnder interferometer.

The system 10 also includes an optical fiber section F3 that is connected at one end to fiber beam splitter 24 and at its opposite end to a detector unit 30 and in particular to a first photodetector 32A therein. The system 10 further includes an optical fiber section F4 that is connected at one end to fiber beam splitter 24 and at its opposite end to a circulator 40. Another optical fiber section F5 connects circulator 40 to detector unit 30 and in particular to a second photodetector 32B therein. Yet another optical fiber section F6 connects a laser 50 to circulator 40. Laser 50 emits light 52. A controller 60 that includes a signal processor 62 is operably connected to detector unit 30.

The system 10 further includes another optical fiber section F7 that is connected at one end to circulator 40 and at another end to motion sensing device 70 ("sensor device") that in an example includes a beam splitter unit 80 and a moving mass unit 90. Optical fiber section F7 is contained in an optical fiber cable C7 (which in an example is armored) that is operably connected to sensor device 70 at a connector 72. In one exemplary embodiment, beam splitter unit 80 includes a single beam splitter element 82 or includes a beam splitter element 84 and a fixed mirror 86, as shown in the two close-up inset views, with the arrows showing light 52 traveling in the Z-direction and reflected light 52R traveling in the −Z-direction. Also in an example, beam splitter unit 80 includes a collimating lens 83 that collimates diverging light 52 that is emitted from end F7E of fiber section F7. Further in an example, beam splitter unit 80 is fiber splitter and collimating lens is located in a separate collimating unit that includes collimating optics such as collimating lens 83, as discussed below.

A free-space optical conduit OPF connects the beam splitter unit 80 to moving mass unit 90, which includes mirror M3 mechanically connected to a reference mass 92. Mirror M3 and mass 92 are shown moving by a length δL in the Z-direction. Moving mass unit 90 is configured so that mirror M3 is constrained to move only in the Z-direction. Examples of moving mass unit 90 are described below.

In various embodiments, interferometer 20, detector unit 30, circulator 40, laser 50 and fiber sections F1 through F6 (along with an upper portion of fiber section F7) constitute a surface unit SU that remains above ground 100 while sensor device 70 is disposed within downhole 102. Note that surface unit SU contains all of the electronics and active components.

During operation of the system 10, a laser 50 generates light 52 in the form of a train of laser pulses 52P. In an example, this is initiated by a control signal S0 from controller 60. Laser pulses 52P travel over fiber section F6 to a circulator 40, which directs the laser pulses down fiber section F7 to a sensor device 70. Each of the laser pulses 52P are incident upon beam splitter unit 80, which splits each laser pulse into two laser pulses, with one of the laser pulses being a first reflected laser pulse 52P1 that heads in the −Z-direction back toward circulator 40. The other laser pulse passes to mirror M3 over free-space optical conduit OPF and reflects from mirror M3 to form a second reflected laser pulse 52P2 that travels in the −Z-direction back over the free-space optical conduit OPF and to fiber end F7E, through fiber section F7 and to circulator 40 behind the first laser pulse 52P1. The circulator 40 directs the first and second reflected laser pulses 52P1 and 52P2 to interferometer 20. Light that returns from interferometer 20 travels to detector unit 30 over either fiber section F3 (and to photodetector 32A) or over fiber sections F4 and F5 by way of the circulator 40 (and to photodetector 32B).

The laser pulses 52P1 and 52P2 pass through a fiber beam splitter 24, which divides each of these laser pulses into two laser pulses. Thus, there are now four laser pulses, namely 52P1 and 52P1' that travel down fiber section F1 and 52P2 and 52P2' that travel down fiber section F2. The respective laser pulses reflect from correspond mirrors M1 and M2 and are directed back to the fiber beam splitter 24, where the pulses interfere. In one embodiment, controller 60 is connected to modulator 28 and controls the operation of the modulator, which in turn controls the optical conduit length of the optical conduit associated with fiber section F1 and mirror M1.

The four laser pulses that arrive at fiber beam splitter thus include a) a "fast" pulse 52P1 that reflected from beam splitter unit 80 and that has taken the shorter path through fiber section F1, b) a 52P2 that reflected from mirror M3 and that has taken the longer path through fiber section F2, c) a short-long pulse 52P1' that reflected from beam splitter unit 80 but that also took the longer path through fiber section F2, and d) a long-short pulse 52P2' that reflected from mirror M3 but that took the shorter path through fiber section F1.

The "fast" and "slow" laser pulses 52P1 and 52P2 are split evenly by fiber beam splitter 24. On the other hand, the short-long pulse 52P1' and long-short pulse 52P2' interfere at fiber beam splitter 24 if the mismatch in their respective optical conduits over which they travel differs by less than their pulse width. The interfered light 52I then travels to photodetectors 32A and 32B in proportion to the interference that occurs at fiber beam splitter 24. Photodetectors 32A and 32B generate respective electrical signals SA and SB that are received and processed by signal processor 62 of controller 60. Electrical signal SA and SB are representative of the intensity of light detected by respective photodetectors 32A and 32B. By analyzing signals SA and SB, one can observe a change in the free-space optical conduit OPL caused by the motion δL of mirror M3.

As a skilled artisan would recognize, the scope of various embodiments of the invention is not limited to usage of unbalanced Mach-Zehnder interferometer. For example, in one embodiment, the surface unit includes an unbalanced interferometer using path matched differential interferometry. In alternative embodiments, the surface unit modulates the generated light and demodulates a returning signal to determine changes of the length of the optical conduit using methods including one or a combination of a phase modulated compensator method, a phase generated carrier method, a frequency modulated continuous wave method, or a differential delayed heterodyne method.

Figure 3:
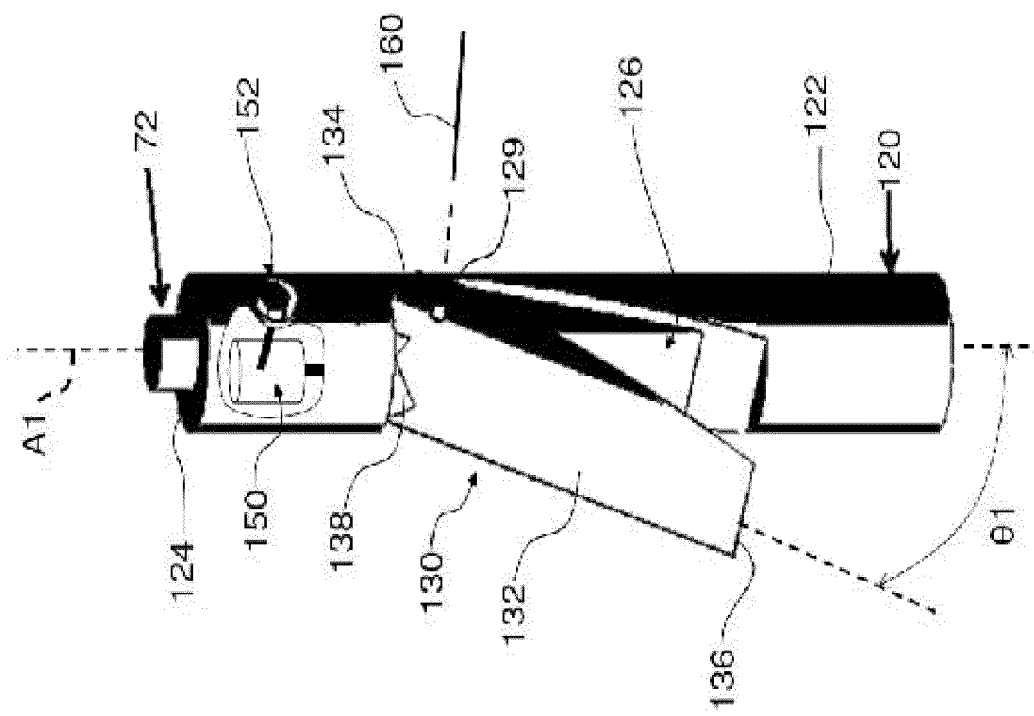
FIG. 3 illustrates a sensor device that includes a casing having automatically deployable latch, according to various embodiments of the invention.

Referring to FIG. 3, in some embodiments, a sensor device 70 includes a load-bearing, generally cylindrical casing 120 having a central axis A1, an outer surface 122 and a top end 124. The casing 120 is used to form a downhole device, as described below. Casing 120 is configured with a latching arm 130 having an outer surface 132 and first and second ends 134 and 136. In some embodiments, the casing 120 is configured in an example to contain three orthogonally arranged sensor heads 170, as introduced and described below.

The latching arm 130 has a closed position wherein it fits into a recess 126 in casing outer surface 122 so that its outer surface 132 is conformal with the casing outer surface. The latching arm 130 is also secured to the casing 120 at or near end 134 via a hinge 138 so that it can swing out into an open position. In the open position, the latching arm 130 forms an angle 61 with axis A1. When deployed in a borehole 102, the latching arm 130 extends outward in the open position to push against the wall of the downhole and secure the casing (and thus the downhole device) in place at a select depth within the downhole.

The casing 120 is also configured with a timing mechanism 150 configured to deploy the latching arm 130 to the open position. In an example, the timing mechanism 150 is mechanical and includes a winding pin 152 on casing outer surface 122 that is used to wind the timing mechanism so that the latching arm deploys at a select time (e.g., depending on the number of turns of the winding pin). In an example, the timing mechanism 150 is similar to the mechanical timing mechanism found in conventional wind-up alarm clocks and timers and can include, for example, a spring and balance wheel (not shown).

In an example, the casing 120 is also configured with a shear pin 160 operably disposed with the latching arm 130 (via hole 129) so that a sufficient upward force on fiber optic cable C7 can break the shear pin and release the latching arm so that the downhole device can be brought back to the surface.

Figure 4A:
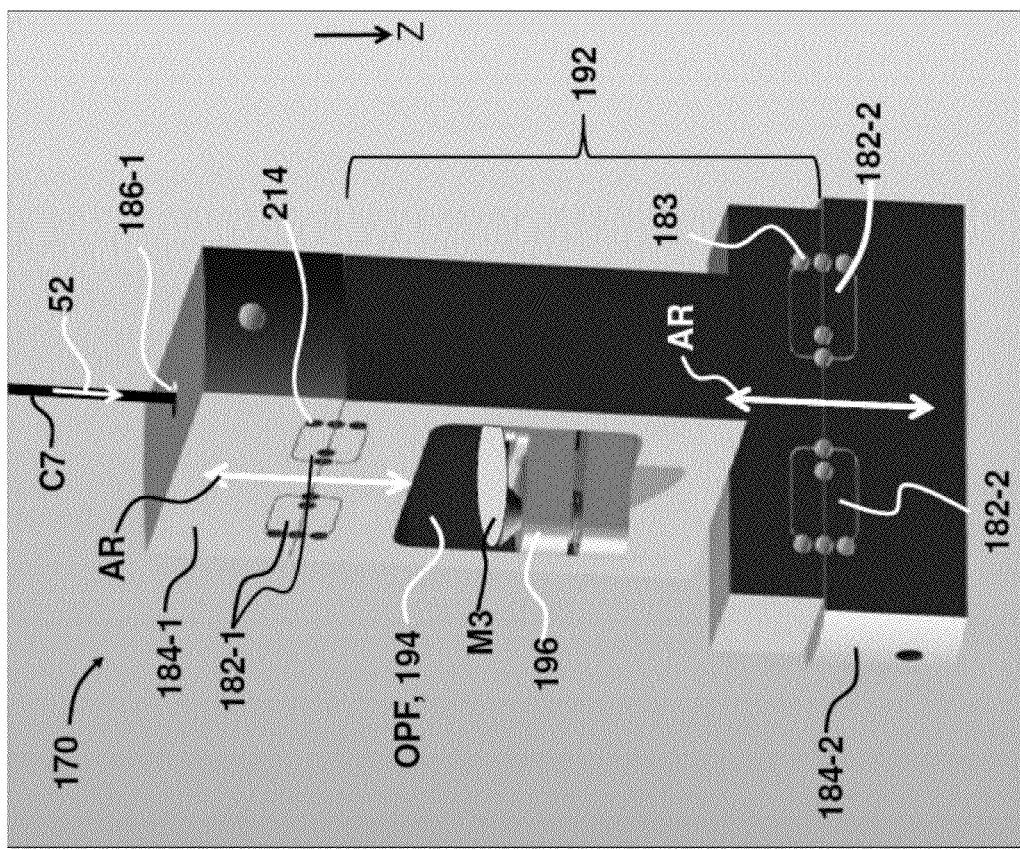
FIGS. 4A-4B illustrate an example sensor head suitable for use in the sensor device of FIG. 3, including a frame and a reference mass attached to the frame via at least one flexure, such that movement of the reference mass relative to the frame is constrained to a single predetermined path
Figure 4B:
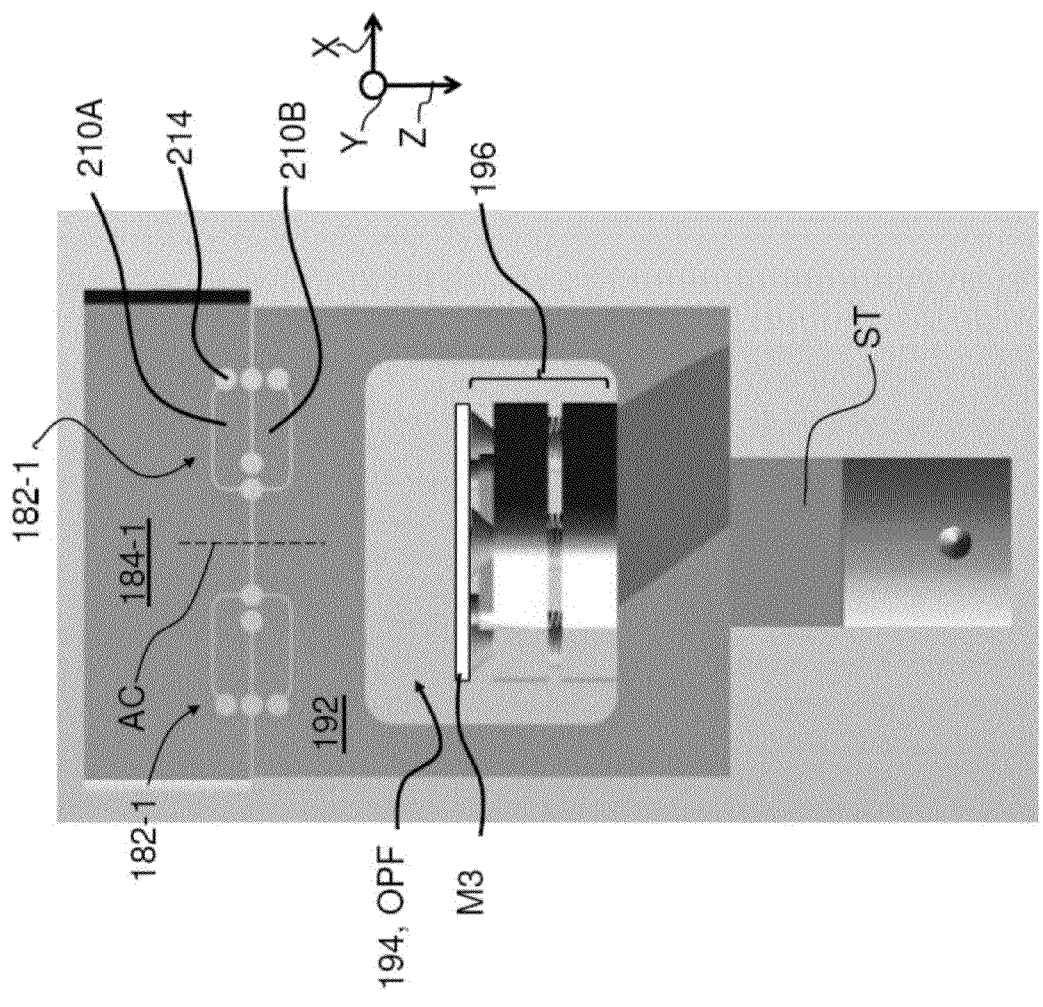

FIGS. 4A-B are different side elevated views of a sensor head 170 for use in the sensor device 70, according to various embodiments of the invention. The sensor head 170 is configured to act as a simple harmonic oscillator that can be probed to characterize its response to external excitation such as seismic activity. In one particular embodiment, the system 10 includes three sensor heads operably supported in the downhole device so that they sense motion in first, second and third orthogonal directions respectively, thereby providing a three-dimensional motion-sensing capability for the system.

The sensor head 170 has a central axis AC and a reference mass 192, which acts as the oscillator that is constrained by the configuration of the sensor head to oscillate substantially only in a direction along the central axis.

The reference mass 192 includes an aperture 194 in which is located a mirror mount 196 that operably supports mirror M3 of the interferometer. The sensor head 170 also includes first flexures 182-1 that operably connect reference mass 192 to a first frame member 184-1 and second flexures 182-2 that operably connect the reference mass to a second frame member 184-2. FIG. 4B shows a stem portion ST that is used to rotatably connect second frame member 184-2 to reference mass 192 (the relative rotation of second frame member 184-2 to reference mass 192 is illustrated in FIG. 4A).

The first and second flexures 182-1 and 182-2 are configured such that the reference mass 192 is suspended relative to respective frame members 184-1 and 184-2 and is constrained to move substantially only in a direction along central axis AC with respect to the frame. Frame members 184-1 and 184-2 are used to rigidly mount sensor head 170 inside a housing, such as the casing 120 discussed above, to form the sensor device 70.

The frame member 184-1 includes an aperture 186 located along central axis AC and through which light 52 traveling in fiber section F7 of fiber optic cable C7 and collimated upstream (as discussed below) can enter sensor head 170. In an example, light 52 exits fiber section F7 within the frame member 184-1 so that it can propagate through the free space within the reference mass 192 and reflect from mirror M3. Thus, fiber section end F7E (not shown; see FIG. 2) is aligned with mirror M3. Also, in an example, the frame member 184-1 include at least one optical component (e.g., lens 53; see FIG. 2) that serves to collimate light 52 that leaves the end of fiber section F7 and travels through free-space optical conduit OPF to mirror M3, and also to collect the reflected collimated light 52R therefrom and focus it onto the fiber section end (see FIG. 2).

Preferably, the sensor head 170 is configured such that the reference mass 192 does not exhibit off-axis mode coupling in its mechanical response. Off-axis displacements act to change the alignment of mirror M3 attached to reference mass 192, resulting in decoupling of the free space collimated light beam 52 and thus the loss of the signal back to surface unit SU. Thus, the sensor head 170 is configured via flexure elements 182-1 and 182-2 to substantially constrain linear translation of the reference mass from moving along the x and y axes, but leave it free to move along the z axis (i.e., along central axis AC), as illustrated by the double-ended arrows AR.

In one embodiment, the flexure elements 182-1 and 182-2 each comprise two symmetrical flexure linkages 210A and 210B, with each linkage defined by a series of three circular notch hinges 214. These linkages join the reference mass 192 to the corresponding frame member 184 of the sensor head and allows for relative movement between the two.

The geometry of flexure linkages 210A and 210B allows for the flexure elements 182 to be primarily compliant to linear (axial) translation along the Z axis. That is, the flexure is softest when pulled or pushed along the Z axis. However, because all of the notch hinges 214 are able to rotate about the Y axis (coming out of the page), the reference mass 192 is not fully constrained and would be free to rotate about the Y axis. Thus, for example, if one flexure linkage is compressed while the other is drawn apart, the reference mass 192 would rotate and the alignment would shift with respect to the frame, leading to a decoupling of the free-space collimated light beam 52 and reduction or loss of the optical signals.

Thus, to constrain the reference mass from rotation about the Y axis, a second flexure element 182 is included in the sensor head. The two flexure elements 182 are identical but are rotated 90 degrees about central axis AC (see FIG. 4B). This orthogonal configuration of flexure elements 182 keeps the linear compliance of each element along the Y axis, but puts the rotational compliance of each flexure elements on orthogonal axes.

In operation, upon arrival of an appropriately polarized seismic wave, the sensor device 170 starts shaking but with the motion of the reference mass 192 constrained to move along central axis AC while the sensor device 70 remains stationary at its location in the borehole. The motion of sensor head causes a change in the length of the free-space optical conduit OPF. This change is observed in the surface unit as a change in arrival times of the signals and a change the interfered signal. This allows for a precise measurement of the amount of seismic-induced motion of reference mass 192 for the given orientation of the sensor head. In the casing where three orthogonally disposed sensor heads 70 are contained in the sensor device 70, the amount of seismic-induced motion can be obtained for all three dimensions.

An example size of sensor head 170 is 3.5" long in the Z-direction, 0.75" wide and 2" wide in the cross-directions. Example materials for sensor head 170 include steel, such as 316 stainless steel, though any metal with a like modulus of elasticity can be used. The resonance and stiffness properties of sensor head 170 can be tuned by changing the flexures 182, and in particular the size and location of notch hinges 214.

In operation, light 52 comes into the sensor device 70 on the single fiber F7. This light then passes through the first splitter 80-1, which sends 30% of the light to the Z-axis collimator unit 85-Z via fiber section F7-Z and 70% of the light to the next splitter 80-2 via a fiber section F7'. The second splitter 80-2 sends an equal amount of light to the Y and X axis collimators 85-Y and 85-X. At each collimator 85, a portion of the light is reflected back to fiber section F7 as reflected light 52R (FIG. 2), which carries the reflected light 52R back to surface unit SU. These reflections represent the fixed portions of the interferometer, i.e., the optical conduit length over which they travel remains fixed.

The remaining light 52 is collimated by the respective collimating optics 87 and proceeds to the respective sensor heads. The Z-axis beam reflects directly off of the mirror M3 of the Z-axis sensor head 170-Z and couples back into its collimator unit 85-Z, while the Y and X axis beams are redirected by a fixed 45 degree mirror M4 to redirect the collimated beam to the axis of interest. The beam is then reflected off of the moving mirror M3 of the sensor head and couples back into its collimator. The total free-space travel of the X, Y and Z axis beams over the respective free-space optical conduits associated with each of the sensor heads 170 is identical to simplify signal processing.

The optical seismic sensor system of FIG. 2 has a number of advantages. First, sensor unit 70 (e.g., sensor head 170) is directional and unaffected by temperature or pressure changes, unlike compliant mandrel designs. Second, the system is substantially insensitive to attenuation, polarization or phase changes between the sensor head and the surface unit, unlike conventional interferometer arrangements such as a single interferometer or a Fabry-Perot cavity in the sensor. Third, the sensor head is a passive and relatively simple device that is substantially resistant to the environmental conditions within the borehole.

In addition, the optical path lengths of the interferometer arms in surface unit SU can be adjusted to compensate for changes in the sensor path lengths due to mechanical stress or temperature changes, but exact path matching is not necessary for signal readout.

Figure 5:
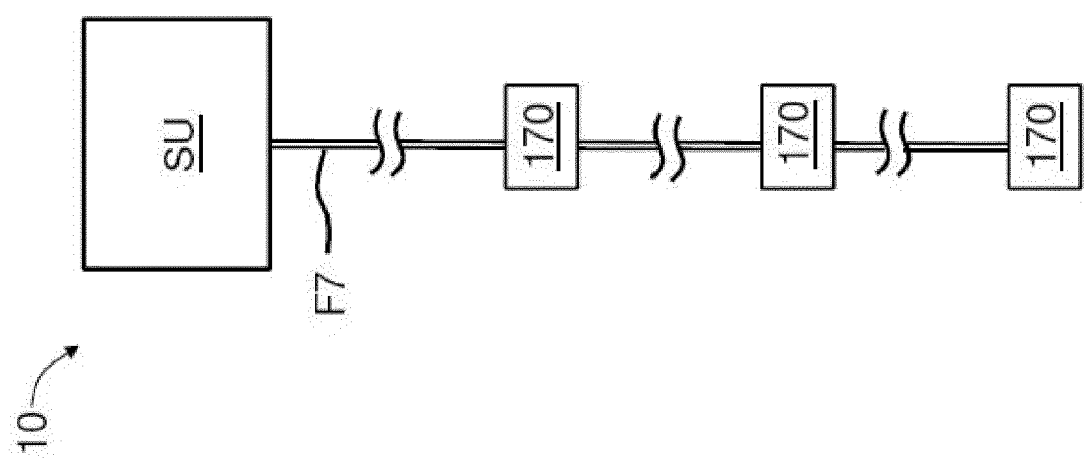
FIG. 5 shows a schematic diagram of an optical-fiber-based system eliminating free-space interferometric segments according to various embodiments of the invention.

However, free-space optics can be negatively affected by dirt and high temperature during an operation of the sensor device. Accordingly, some embodiments are based on a realization that by using intrinsic sensing geometry, the usage of the free-space optics can be eliminated. Specifically, the optical conduit can be encapsulated in the fiber, which create ruggedized sensing head that can survive and operate for a long time in the harsh downhole environment FIG. 5 shows a schematic diagram of an optical-fiber-based system 10 according to another embodiment of the invention that eliminates free-space interferometric segments. The result is a fully fiber-based system 10 (i.e., no free-space optical conduits) that minimizes optical loss and that can be used to multiplex a large number sensor heads 170 along a single fiber F7. In this and other embodiments, the sensor device can include one or plurality of sensors for sensing seismic disturbance from a plurality of directions. For example, FIG. 5 shows three sensor heads 170 optically connected to the surface unit. In some embodiments, a plurality of sensors can be arranged within the sensor device to sense the seismic disturbances from orthogonal directions.

Figure 6:
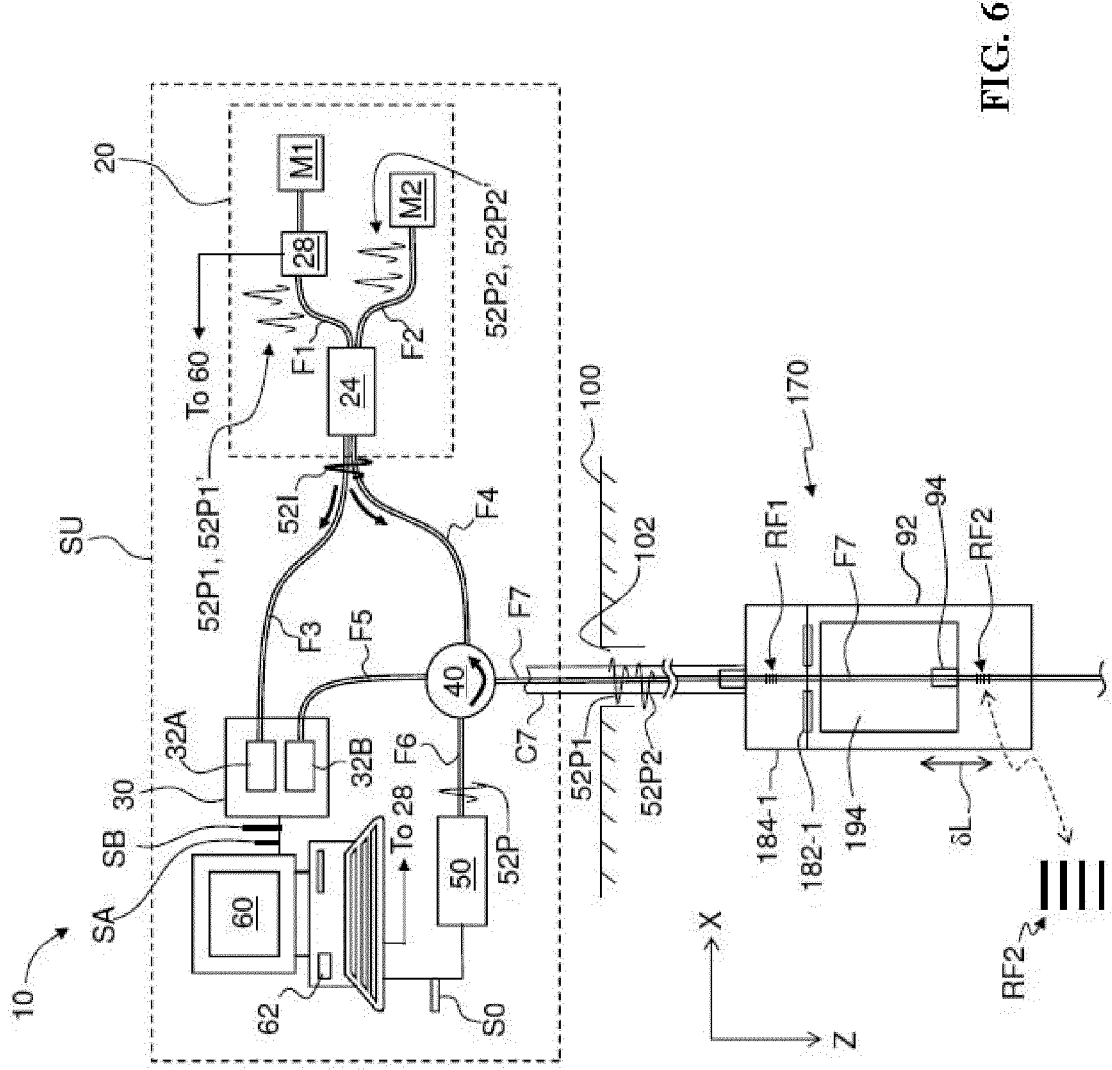
FIG. 6 is a schematic diagram of the interferometric optical seismic sensor system according to some embodiments of the invention.
Figure 7:
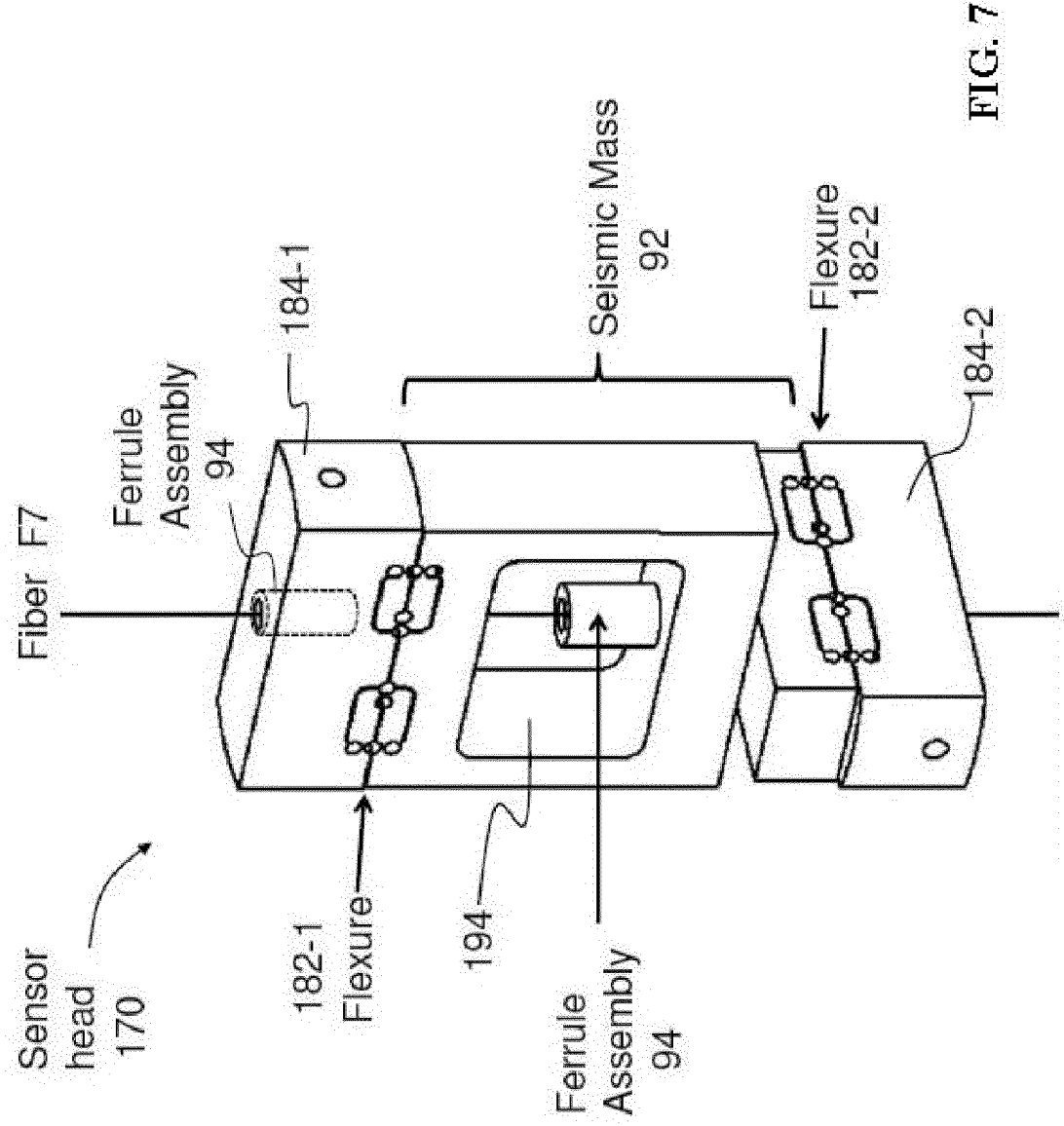
FIG. 7 illustrate an example fiber-based sensor device suitable for use with the interferometric optical seismic sensor system of FIG. 6

FIG. 6 is similar to FIG. 2 and shows the same surface unit SU operably coupled to fiber F7, which travels through one or more sensor heads 170. The sensor heads 170 now include fiber F7 running through first frame member 184-1 and through mass unit 92. FIG. 7 is a more detailed view of an example sensor 170 used with fiber-based system 10. Fiber F7 includes first and second reflecting features RF1 and RF2 configured to reflect light traveling down fiber F7 back to surface unit SU. In an example, first and second reflecting features comprise gratings, such as Bragg gratings, as illustrated in the close-up view of RF2. An example range on reflectivity for reflecting features RF1 and RF2 is 3% to 10%, though generally the reflectivity is chosen based on the number of the sensor heads 170 used, and the amount of light needed to make it to the last sensor head in the daisy chain.

Fiber F7 is secured to first frame member 184-1 and to mass unit 92. Mass unit 92 includes first and second ferrule assembly 94 used to respectively secure fiber F7 to frame member ("frame") 184-1 and to mass unit (reference mass) 92, as described below. The securing of fiber F7 to frame member 184-1 and mass unit 92 is described below.

Thus, with reference to FIGS. 6-7, the sensor head 170 are operably arranged on a single fiber cable are arranged in series along (e.g., daisy-chained onto) a single fiber cable C7 that includes fiber F7. Fiber F7 is attached to each sensor head 170 at two locations, namely stationary frame 184-1 and mass unit 92, so that movement of the mass unit can stretch fiber F7. This stretching is small enough such that the fiber does not break but large enough to detect through interference an amount of stretching that can be related to the movement of the mass unit. An example fiber F7 can readily stretch up to 1% of its length without breaking, e.g., can stretch 1 mm for a 10 cm fiber segment.

Each sensor head 170 has associated therewith in fiber F7 the aforementioned reflecting features RF1 and RF2 arranged within or along fiber F7 (i.e., reflecting features can be components added to fiber F7 rather than being formed within the fiber). Reflecting features RF1 and RF2 are located "outside" the fiber mounting points, as described below.

In the operation of fiber-based system 10, laser pulse 52P arrives from surface unit SU and travels down fiber F7 to sensor head 170, as described above. However, now laser pulse 52P is incident upon reflecting features RF1 and RF2, thereby creating two relatively faint reflected pulses 52P1 and 52P2 that travel back to surface unit SU, while the main pulse keeps propagating towards the downstream sensor heads. Reflected pulses from the downstream sensor heads 170 also return to surface unit SU through fiber F7.

As a seismic wave shakes sensor head 170 and perturbs the relative distance between the reference mass 92 and the frame 184-1, the length of fiber F7 changes over the span between these components, thereby changing the distance between the first and second reflecting features RF1 and RF2. The change in distance is represented by a change in the separation between first and second reflected pulses 52P1 and 52P2. The reflected pulses 52P1 and 52P2 are then analyzed as described above in connection with the embodiment of system 10 as set forth in FIG. 1.

The operation of fiber-based system 10 is thus similar to the free-space based version of this system as described above in connection with FIGS. 2-5, except instead of stretching the free-space optical conduit, the integrated fiber-optical conduit is stretched.

One consideration in the operation of fiber-based system 10 is to ensure that reflecting features RF1 and RF2 can perform their reflecting function over the expected operating temperature range, which in an example is up to 300° C. Example reflecting features in the form of fiber Bragg gratings or an air gap in fiber F7 would generally be able to meet this operating temperature requirement.

In one embodiment, the surface unit SU requires that the two reflected pulses 52P1 and 52P2 have substantially the same polarization. This requires that fiber F7 not have substantial amounts of birefringence, which can alter the polarization of the reflected pulses and which can increase the floor of the device noise. To this end, fiber F7 needs to be secured to frame 184-1 and mass unit 92 in a manner that does not introduce birefringence in the fiber. In addition, the relatively high operating temperature of system 10 makes many of the conventional fiber-securing approaches unsuitable.

Figure 8A:
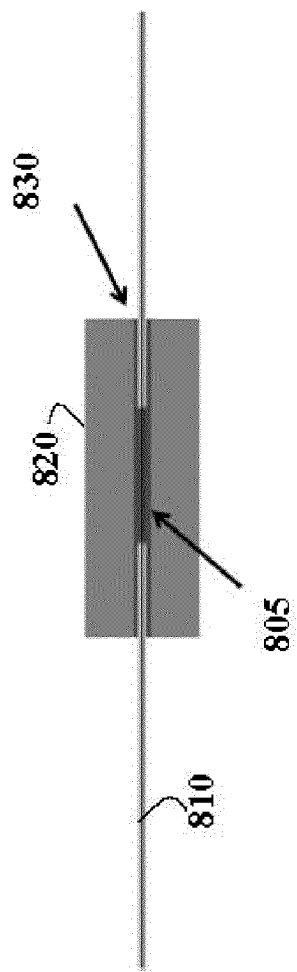

With reference to FIG. 8A, in a first example embodiment, a stripped section 805 of polyimide coated fiber 810 is inserted into a stainless steel ferrule 820 that is then filled with a high temperature adhesive 830. The fiber is supported in the center of the ferrule as the adhesive is cured, ensuring that there is an even distribution of adhesive between the fiber and ferrule. After the adhesive has set, the resulting ferrule assembly 94 may be mounted by a variety of known methods to either the mass unit 92 or the sensor frame 184-1 without transmitting significant stresses to the fiber F7. Two such ferrule assemblies 94 can be formed on the same section of fiber F7 and then operably secured to the sensor head 170, with one ferrule assembly mounted to the mass unit and the other to the sensor frame.

Differential thermal expansion between the ferrule, adhesive and fiber may apply radial stresses to the fiber during thermal excursions, but these stresses will be distributed evenly about the cross section of the fiber, thereby mitigating the adverse effect of stress-induced birefringence.

Figure 8B:
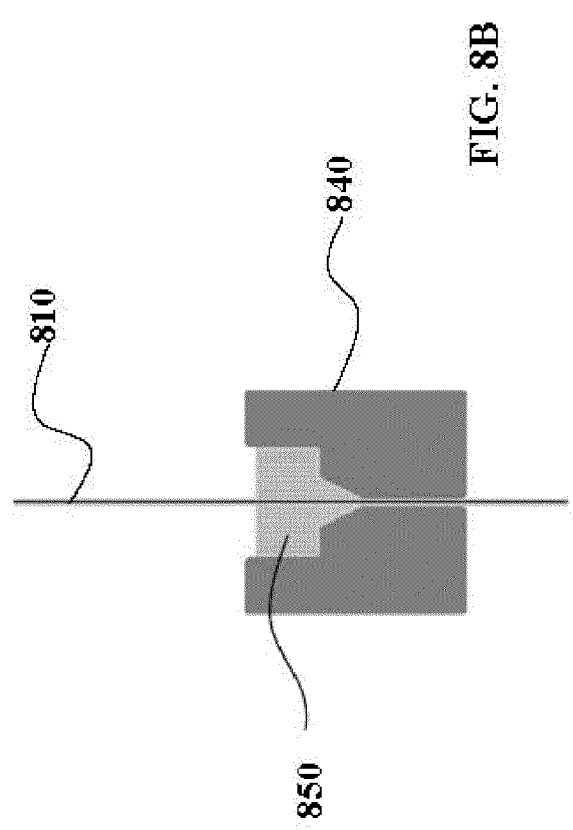

In a second example embodiment illustrated in FIGS. 8B and 8C, the polyimide coated fiber 810 is inserted into a fixture mold 840 that is then filled with a mixture of carbon or metallic particles (as reinforcement materials) suspended in a polyimide resin 850. The fixture mold is then heated to cure the resin, which hardens and shrinks to form a fixture that is tightly bonded to the polyimide coating of the fiber. The reinforcement material may be selected to appropriately tailor the thermal expansion coefficient of the fixture, depending on what material is selected for the structure of the sensor frame and reference mass to which it is mounted.

The composite fixture is shown in FIG. 8C. The fixture can include clamping surfaces 860 that allow the fixture to clamped along the axis of the fiber to avoid introducing stresses on the fiber within the fixture. Thus, first and second fixtures can be used in place of the first and second ferrule assemblies to secure fiber F7 to the frame and reference mass.

The major difference between these example embodiments for securing fiber section F7 to sensor head 170 is that the first relies on bonding to the glass of the fiber itself, while the second relies on bonding to the polyimide coating of the fiber.

Some embodiments of the invention minimize the fabrication challenges posed by arrangement of the fiber in the sensor head, as described above. The starting point of the sensor design was the shape of a sensor body formed by the frame and the reference mass of the sensor head. In some embodiments, the shape of the sensor body is designed such that the optical fiber can loop around at least a portion of the frame and at least a portion of the reference mass forming a fiber coil, which can simplify the attachment of the fiber to the sensor body. In addition, by forming multiple fiber coils around the sensor body, sensitivity of the sensor can be increased, because the resultant output is proportional to the number of fiber coils.

Figure 9:
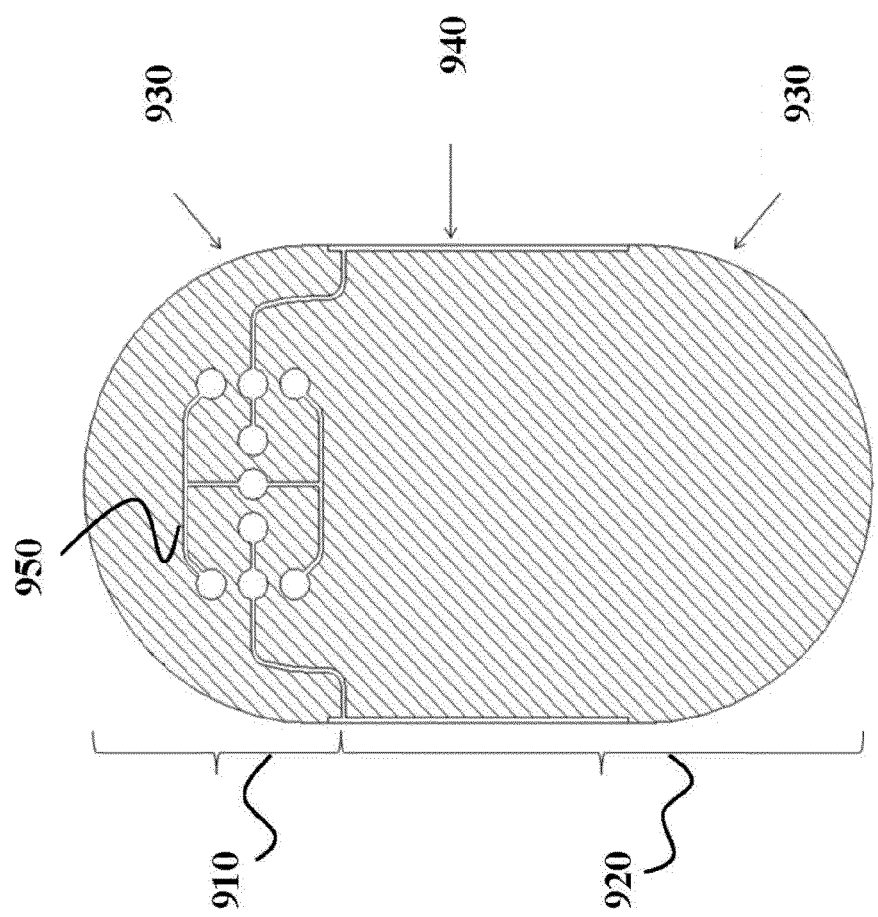
FIGS. 9-12 show in more detail the components of the sensor device according to another embodiment of the invention.

In some embodiments, the profile of the sensor body is an oblong racetrack shape, with two semicircular sections of the same radius connected by two straight tangential sections. The optical fiber is arranged around the sensor body forming a plurality of coils encircling the unit multiple times over the semicircular and straight sections, such that the relative movement of the reference mass of the sensor body equally changes a length of each coil. For example, the fiber coil can be affixed to the semicircular sections of the sensor body with an adhesive suitable to withstand a temperature in the borehole, and the fiber coil is not fixed to the sensor body along a length of the straight sections FIG. 9 shows a cross-section of a sensor body 900 formed by a frame 910 and a reference mass 920 of the sensor head. A cross-section substantially 900 formed by two semicircular sections 930 connected by two straight sections 940. In this embodiment, the optical module includes a fiber coil orbiting the sensor body multiple times over the semicircular and straight sections.

The reference mass 920 constraint to move with respect to the fixed frame 930 by a flexure 950 in the vertical axis, stretching the two straight fiber sections. Many fiber coils can be added, each coil having two straight stretched sections. Multiple fiber coils increases the sensitivity of the sensor, as the same displacement of the reference mass results in a greater total change in length of the fiber. For example, if there are 10 fiber coils and the reference mass displaces by one micron, each fiber coil changes in length by two microns and the fiber as a whole changes in length by 20 microns. If there are 25 loops, a one micron displacement of the reference mass results in a 50 micron increase in fiber length, a more easily detectable signal. The curved, semicircular section of each fiber loop can be fixed to their respective structures with an adhesive. One embodiment uses a high temperature ceramic adhesive, which can sustain desired operating temperature range of temperatures up to 300 degrees centigrade. For lower temperature applications, other adhesives can be used.

The flexure connecting the reference mass with the frame of the sensor constrains the relative motion of the reference mass to a single path and determines the characteristics of the sensor's response to seismic stimulation, as explained above. Predictable linear translation of the reference mass is a feature of the design of various embodiments, as accurate knowledge of the displacement of the three components of the 3C sensor is important to accurately determining the displacement vector of the seismic event experienced by the sensor device. The fiber coil of each sensor head must only deform and generate a signal when the sensor in stimulated along the axis of interest. If the sensor head is sensitive to off-axis stimulation, there is a crosstalk between the axes, and the seismic data is less reliable.

In some embodiments, the flexures constraining the movement of the reference mass with respect to the frame are designed with fabrication process and conditions of operation in mind. To that end, the flexures used by some embodiments are based on circular notch hinges allowing a single rotational degree of freedom. Those embodiments are designed to avoid introduction of additional elements complicating calibration of the sensor and increasing the cost of the maintenance.

Figure 10:
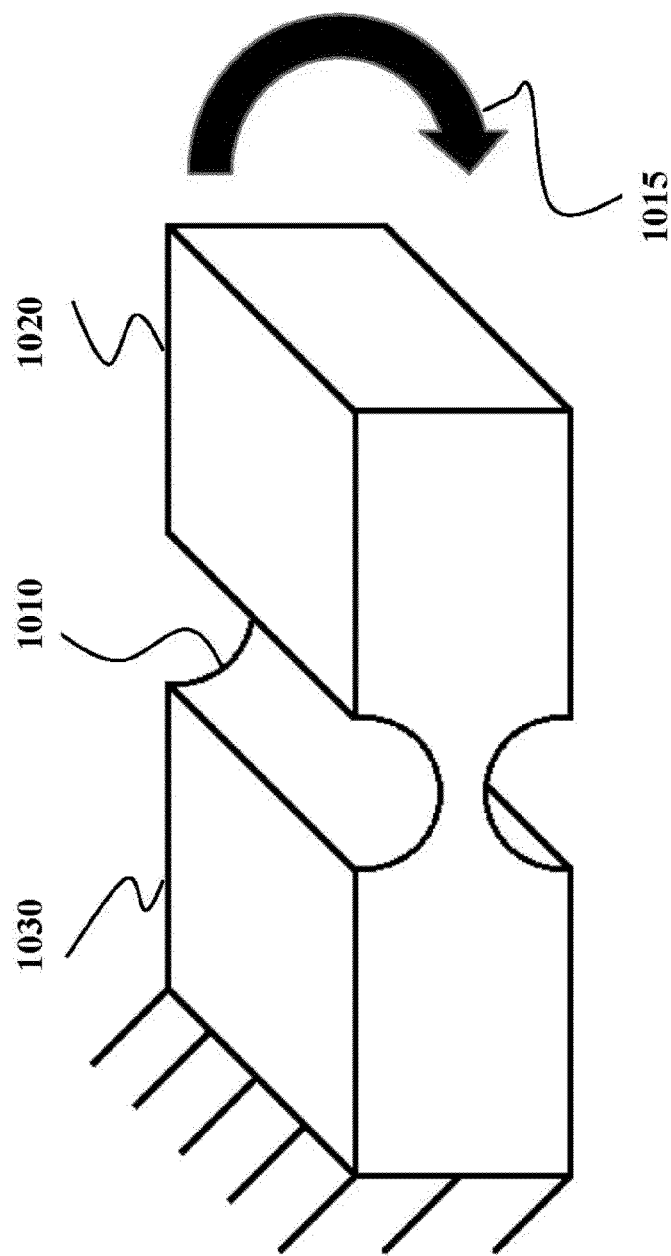
Figure 10:
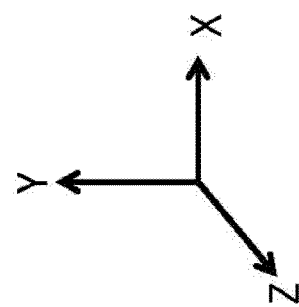

FIG. 10 is a schematic of a basic circular notch hinge 1000. This basic flexure element is compliant (relatively free to move) in rotation 1015 about the Z axis, allowing the moving section 1020 to rotate with respect to the fixed section 1030. The thin web of the hinge elastically deforms to allow rotation of the moving section of the structure, acting essentially as a torsion spring. The circular profile of the notches help prevent stress concentrations from developing in the hinge, a similar flexure with sharp corners in the compliant section is more likely to experience fatigue failure. The circular notch hinge also offers easy repeatability of manufacture using a variety of methods and very predictable elastic behavior in a variety of dynamic conditions. The circular notch hinge behaves similar to a pinned joint in its elastic range of motion.

Figure 11:
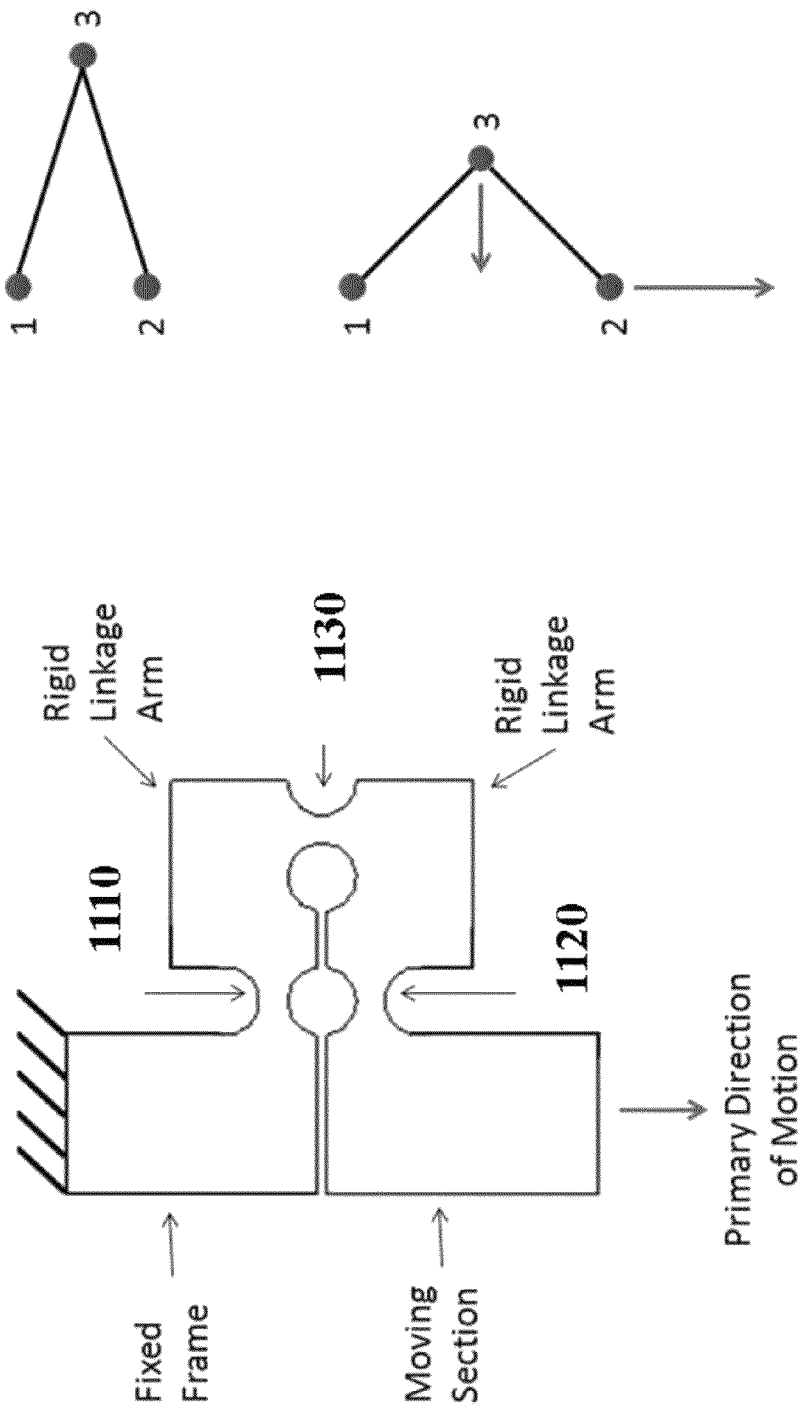

FIG. 11 shows an example of a flexure linkage 1100 including by three circular notch hinges, 1110, 1120, and 1130. A system of notch hinges joined by rigid elements can approximate the motion of a three point pinned linkage, as shown on the right. In some embodiments, the three notch hinges 1110, 1120, and 1130 arranged at vertices of an isosceles triangle. Specifically, a projection of the three notch hinges on the plane of the path of the relative movement (e.g., a plane of the page) from the isosceles triangle.

The linkage shown in FIG. 11 allows for linear translation of the moving section in the vertical axis. This linkage structure also allow for possible horizontal translation of the moving section as well as rotation of the moving section. To stabilize the motion of the moving section to a single axis of linear translation, a series of similar flexure linkages are incorporated into the system, arranged in such a way to share only a single axis of linear compliance.

Figure 12:
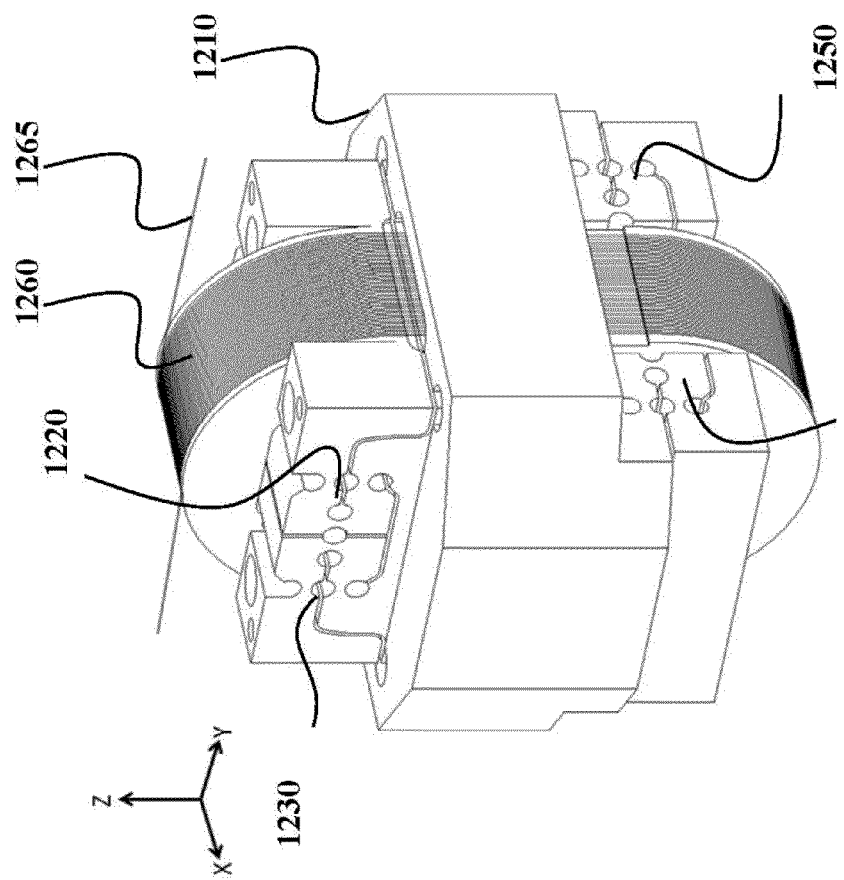

FIG. 12 shows a sensor head 1200 formed by the frame and the mass, which incorporates multiple flexure linkages that stabilize the motion of the mass. In this embodiment, the sensor body 1210 has a cross-section substantially formed by two semicircular sections connected by two straight sections, as shown in FIG. 9. The optical fiber 1260 encircles the sensor body multiple times over the semicircular and straight sections forming a plurality of coils. Fiber tails 1265 can optically connect the sensor device to the surface unit for receiving the optical signal.

The flexure includes a first flexure linkage 1220 and a second flexure linkage 1230 arranged as a symmetrical reflection of the first linkage over a first plane of the path of the movement. The flexure also includes a third flexure linkage 1240 and a fourth flexure linkage 1250 arranged as a symmetrical reflection of the third linkage over a second plane of the single direction and perpendicular to the first plane, wherein each flexure linkage includes three notch hinges. In various embodiments, the first and the second planes are parallel to the corresponding sides of the sensor body, include a central axis of the sensor body and extend into the predetermined path of the relative movement.

In one embodiment, there are two flexure linkages on the top end of the sensor body constraining linear translation of the reference mass primarily in the Z-axis but also in the Y-axis, and rotation about the X-axis. The two flexure linkages on the lower end of the sensor body allow for Z-axis linear translation as well as X-axis, and rotation about the Y-axis. Because the only motion allowed by both sets of flexures is Z-axis linear translation, the motion of the reference mass is effectively constrained to this axis.

This system of flexure hinges allows the system to be properly constrained without incorporating any bearing surfaces or other constraint methods that rely on surface contact between the reference mass and frame. Such constraint methods could potentially lead to frictional forces that vary between each sensor, resulting in changes to the harmonic response of the sensor or insensitivity to small seismic events due to high static friction. A total of four flexure linkages, two in each orientation, were used in this sensor design to increase stiffness of the sensor while maintaining the desired range of motion driven by the elastic limits of the fiber coil.

Alternative embodiments are constructed with just one flexure linkage in each orientation if spatial constraints and flexure stiffness requirements are different. The fiber coil is arranged in the sensor in such that the straight sections of the coil are oriented along the Z axis which keeps the force applied to each fiber section along the central axis of the fiber, avoiding bending and stress concentrations at the fixed end of each stressed fiber section.

Another advantage of utilizing notch hinge flexures in this design is the precision and repeatability of the manufacturing processes involved. The flexures can be cut from a monolithic block of material using a wire electric discharge machine (EDM) on a single pass. EDM is a very precise and controllable machining process that allows deep cuts of very small features without the risk of chatter, deviating drill bits, or temperature changes that could affect the heat treatment of the material. The stiffness of the hinges is driven primarily by the thickness of each notch hinge. Changing the diameter of the holes used to form these notch hinges allows the sensor to be manufactured to exhibit a different harmonic response without changing any other aspect of the design. In this way, in addition to changing the number of fiber loops, the sensor can be tuned to exhibit the desired level of sensitivity for the frequency range of interest.

The other features of the flexures in this specific sensor design, such as the spacing between the notch hinges and the specific placement of the flexure linkages can be influenced by spatial constraints for our initial deployment scenario of the sensor into the sensor device and/or to the borehole.

The combined fiber coil and flexure mass system described herein offers highly accurate linear translation without any bearings or friction surfaces. The reference mass, frame components and flexures can be made from a single piece of material (although the sensor body 1210 uses two pieces to simplify the fiber-winding process). A large variety of metallic materials may be used to construct these components depending on the final use case scenario (operating temperature, CTE matching to existing equipment, chemical compatibility). One embodiment is using 303 free-machining stainless steel for the structure of the sensor to allow for ease of machining and because the material is delivered without any internal stresses from the supplier. Cold working and other manufacturing processes at a steel mill may introduce internal stresses into the steel which can cause the flexures to deform once they are cut with the EDM wire. However, reliable materials and dedicated tooling allow for a wider range of material options.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein.

It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An optical seismic sensor system for measuring seismic events in a geological formation, comprising:
    a surface unit for generating and processing an optical signal; and
    a sensor device optically connected to the surface unit for receiving the optical signal over an optical conduit, the sensor device includes at least one sensor head for sensing a seismic disturbance from at least one direction during a deployment of the sensor device within a borehole of the geological formation, the sensor head comprising:
    a frame affixed within the sensor device;
    a reference mass attached to the frame via at least one flexure, such that movement of the reference mass relative to the frame is constrained to a single predetermined path; and
    an optical module forming at least part of the optical conduit connecting the frame, the reference mass and the surface unit, such that the movement of the reference mass relative to the frame changes a length of the optical conduit, wherein the flexure includes a first flexure member and a second flexure member that each includes first and second symmetrical flexure linkages respectively defined by at least three notch hinges.

2. The system of claim 1, wherein the sensor device includes a plurality of sensor heads for sensing seismic disturbances from a plurality of directions.

3. The system of claim 2, wherein the plurality of sensor heads arranged within the sensor device to sense the seismic disturbances from orthogonal directions.

4. The system of claim 1, wherein the sensor device is optically connected to the surface unit via an optical fiber section, the optical module of the sensor head including a mirror aligned to reflect the optical signal, such that the mirror and the optical fiber section are in optical communication over a free space forming a part of the optical conduit.

5. The system of claim 1, wherein the optical module includes an optical fiber attached to the frame and to the reference mass, such that the relative movement of the reference mass changes a length of the optical fiber.

6. The system of claim 5, wherein the optical fiber forms at least one coil around at least a portion of the frame and at least a portion of the reference mass.

7. The system of claim 5, wherein the optical fiber is arranged around the frame and the reference mass forming a plurality of coils such that the relative movement of the mass equally changes a length of each coil.

8. The system of claim 1, wherein the sensor device comprises a casing that includes a deployable latching arm for fixing the sensor device within the borehole.

9. The system of claim 8, wherein the casing includes a timing mechanism configured to deploy the latching arm to an open position, the timing mechanism includes a winding pin for selecting a time of deployment, the casing further includes a shear pin operably disposed with the latching arm so that a sufficient upward force on the sensor device breaks the shear pin and releases the latching arm.

10. The system of claim 1, wherein the first and second symmetrical flexure linkages are respectively defined by at least three substantially circular notch hinges.

11. The system of claim 1, wherein the surface unit includes at least one unbalanced interferometer having first and second arms with at least one of the arms having an adjustable optical conduit, the interferometer configured to interfere and process the optical signal.

12. An optical seismic sensor system for measuring seismic events in a geological formation, comprising:
    a surface unit for generating and processing an optical signal; and
    a sensor device optically connected to the surface unit for receiving the optical signal over an optical conduit, the sensor device includes at least one sensor head for sensing a seismic disturbance from at least one direction during a deployment of the sensor device within a borehole of the geological formation, the sensor head comprising:
    a frame affixed within the sensor device;

a reference mass attached to the frame via at least one flexure, such that movement of the reference mass relative to the frame is constrained to a single predetermined path; and an optical module forming at least part of the optical conduit connecting the frame, the reference mass and the surface unit, such that the movement of the reference mass relative to the frame changes a length of the optical conduit, wherein the optical module includes an optical fiber attached to the frame and to the reference mass, such that the relative movement of the reference mass changes a length of the optical fiber, and wherein the frame and the reference mass form a sensor body having a cross-section substantially formed by two substantially semicircular sections connected by two substantially straight sections, wherein the optical module includes a plurality of fiber coils encircling the sensor body over the semicircular and straight sections.

13. The system of claim 12, wherein the fiber coil is affixed only to the substantially semicircular sections of the sensor body with an adhesive suitable to withstand a temperature in the borehole.

14. The system of claim 12, wherein the sensor device comprises a casing that includes a deployable latching arm for fixing the sensor device within the borehole.

15. The system of claim 14, wherein the casing includes a timing mechanism configured to deploy the latching arm to an open position, the timing mechanism includes a winding pin for selecting a time of deployment, the casing further includes a shear pin operably disposed with the latching arm so that a sufficient upward force on the sensor device breaks the shear pin and releases the latching arm.

16. The system of claim 12, wherein the surface unit includes at least one unbalanced interferometer having first and second arms with at least one of the arms having an adjustable optical conduit, the interferometer configured to interfere and process the optical signal.

17. The system of claim 12, wherein the sensor device includes a plurality of sensor heads for sensing seismic disturbances from a plurality of directions.

18. The system of claim 17, wherein the plurality of sensor heads arranged within the sensor device to sense the seismic disturbances from orthogonal directions.

19. The system of claim 12, wherein the sensor device is optically connected to the surface unit via an optical fiber section, the optical module of the sensor head including a mirror aligned to reflect the optical signal, such that the mirror and the optical fiber section are in optical communication over a free space forming a part of the optical conduit.

20. The system of claim 12, wherein the optical module includes an optical fiber attached to the frame and to the reference mass, such that the relative movement of the reference mass changes a length of the optical fiber.

21. An optical seismic sensor system for measuring seismic events in a geological formation, comprising:
a surface unit for generating and processing an optical signal; and
a sensor device optically connected to the surface unit for receiving the optical signal over an optical conduit, the sensor device includes at least one sensor head for sensing a seismic disturbance from at least one direction during a deployment of the sensor device within a borehole of the geological formation, the sensor head comprising:
a frame affixed within the sensor device;
a reference mass attached to the frame via at least one flexure, such that movement of the reference mass relative to the frame is constrained to a single predetermined path; and
an optical module forming at least part of the optical conduit connecting the frame, the reference mass and the surface unit, such that the movement of the reference mass relative to the frame changes a length of the optical conduit, wherein the flexure includes a first flexure linkage and a second flexure linkage, each flexure linkage including at least three notch hinges, wherein the second flexure linkage is arranged as a symmetrical reflection of the first linkage over a first plane of the path of movement of the reference mass.

22. The system of claim 21, wherein the flexure includes a third flexure linkage and a fourth flexure linkage arranged as a symmetrical reflection of the third linkage over a second plane of the path of movement of the reference mass, wherein the second plane is perpendicular to the first plane.

23. The system of claim 22, wherein a projection of the three notch hinges of the first or the second flexure linkage on the second plane, or a projection of the three notch hinges of the third or the fourth flexure linkage on the first plane form an isosceles triangle.

24. The system of claim 21, wherein the sensor device comprises a casing that includes a deployable latching arm for fixing the sensor device within the borehole.

25. The system of claim 24, wherein the casing includes a timing mechanism configured to deploy the latching arm to an open position, the timing mechanism includes a winding pin for selecting a time of deployment, the casing further includes a shear pin operably disposed with the latching arm so that a sufficient upward force on the sensor device breaks the shear pin and releases the latching arm.

26. The system of claim 21, wherein the surface unit includes at least one unbalanced interferometer having first and second arms with at least one of the arms having an adjustable optical conduit, the interferometer configured to interfere and process the optical signal.

27. An optical sensor device for measuring seismic events in a geological formation, comprising:
a casing having a deployable latching arm for fixing the sensor device within a borehole of the geological formation.
a frame affixed to the casing;
a reference mass attached to the frame via at least one flexure, such that movement of the reference mass relative to the frame is constrained to a single predetermined path; and
a waveguide connected to the frame and the reference mass such that the relative motion of the mass changes a length of the waveguide, wherein the frame and the reference mass form a sensor body having a cross-section substantially formed by two substantially semicircular sections connected by two substantially straight sections, wherein the waveguide includes a fiber coil looping the sensor body multiple times over the substantially semicircular and straight sections forming a plurality of fiber coils, such that the relative motion of the mass equally changes a length of each fiber coil.

28. An optical sensor device for measuring seismic events in a geological formation, comprising:
a casing having a deployable latching arm for fixing the sensor device within a borehole of the geological formation.
a frame affixed to the casing;

a reference mass attached to the frame via at least one flexure, such that movement of the reference mass relative to the frame is constrained to a single predetermined path; and a waveguide connected to the frame and the reference mass such that the relative motion of the mass changes a length of the waveguide, wherein the flexure includes a first flexure linkage and a second flexure linkage, each flexure linkage includes three notch hinges, wherein the second flexure linkage is arranged as a symmetrical reflection of the first linkage over a first plane of the path of movement of the reference mass.

29. An optical sensor device for measuring seismic events in a geological formation, comprising:
- a frame;
- a reference mass attached to the frame via at least one flexure, such that movement of the reference mass relative to the frame is constrained to a single predetermined path;
- wherein the frame and the reference mass form a sensor body having a cross-section substantially formed by two semicircular sections connected by two straight sections, wherein the flexure includes
  - a first flexure linkage and a second flexure linkage, wherein the second flexure linkage is arranged as a symmetrical reflection of the first linkage over a first plane of the path of the movement of the reference mass, and
  - a third flexure linkage and a fourth flexure linkage, wherein the fourth flexure linkage is arranged as a symmetrical reflection of the third linkage over a second plane of the path of the movement of the reference mass, wherein the second plane is perpendicular to the first plane, and wherein each flexure linkage includes three notch hinges forming an isosceles triangle; and
- an optical fiber looping the sensor body multiple times forming a plurality of fiber coils, such that the relative motion of the mass equally changes a length of each fiber coil.

\* \* \* \* \*